April 19, 1960 R. E. GIBONEY 2,933,002
CONTROL FOR AUTOMATIC PUNCH AND NOTCH LINE
Filed July 24, 1957 7 Sheets-Sheet 1

WITNESSES
Edwin E. Bowler
Wm. B. Sellers.

INVENTOR
Ray E. Giboney
BY
Paul E. Friedemann
ATTORNEY

April 19, 1960     R. E. GIBONEY     2,933,002
CONTROL FOR AUTOMATIC PUNCH AND NOTCH LINE
Filed July 24, 1957     7 Sheets-Sheet 7

United States Patent Office 2,933,002
Patented Apr. 19, 1960

2,933,002

CONTROL FOR AUTOMATIC PUNCH AND NOTCH LINE

Ray E. Giboney, Williamsville, N.Y., assignor to Westinghouse Electric Corporation, East Pittsburgh, Pa., a corporation of Pennsylvania Application July 24, 1957, Serial No. 673,846

12 Claims. (Cl. 83—222)

This invention relates to machines for fabricating sheet metal, and relates more particularly to controls for machines for fabricating laminations, such as are used in the cores of transformers, from metal strip.

A line of machines known as a "punch and notch line" is in common use for fabricating laminations for transformer cores from sheet steel strip. Such a line includes a pay-off reel of sheet steel which supplies a steel strip through a slack control device, a horizontal billy roll, a 45° billy roll, and feed rolls on a carriage, to a press containing shears and notching dies. The carriage is moved forwardly towards the press to feed a length of strip thereto, and at an intermediate forward position, closes a limit switch which starts the feed rolls to feed the strip into the press faster than the rate of advance of the carriage, for a predetermined length of strip. Then limit switches act, first to slow the rolls, and then to brake them to a stop. As soon as the feed rolls are stopped, the press is started to shear the strip. At or near the end of the stroke of the press, a limit switch is closed and causes the carriage to retract. The press shears the strip on a bias, so in order to conserve strip material, the feed rolls are rotated bodily each time the carriage returns for a new length of strip, for turning the strip over through an angle of 180°. After a reversal of the strip, the carriage again moves forward, and again feeds and operates the shears.

An object of this invention is to control, with static logic decision elements, machines for operating upon strip material.

Another object of this invention is to improve the controls used with a punch and notch line.

Another and more definite object of this invention is to control the operation of a punch and notch line with static logic decision elements.

Static logic decision elements as used in this invention, employ no contacts, are more nearly trouble free, and require less maintenance than the relays which were formerly used to control punch and notch lines.

This invention will now be described with reference to the annexed drawings, of which:

Figs. 1A and 1B together comprise a side elevation of a punch and notch line embodying this invention;

Figs. 2A and 2B together comprise a plan view looking downwardly upon the showings in Figs. 1A and 1B;

Fig. 3 is a view taken along the line III—III of Fig. 1A;

Figs. 4A, 4B, 4C and 4D together are a circuit schematic of a system for the control of the punch and notch line of Figs. 1A, 1B, 2A, 2B and 3;

Figure 1A:
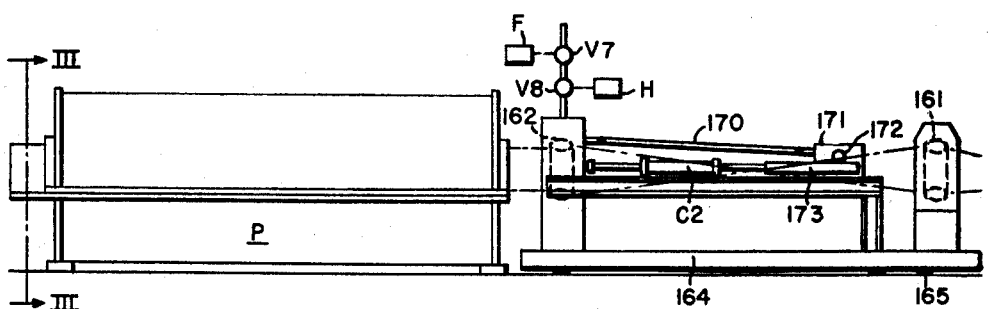
Figure 2A:
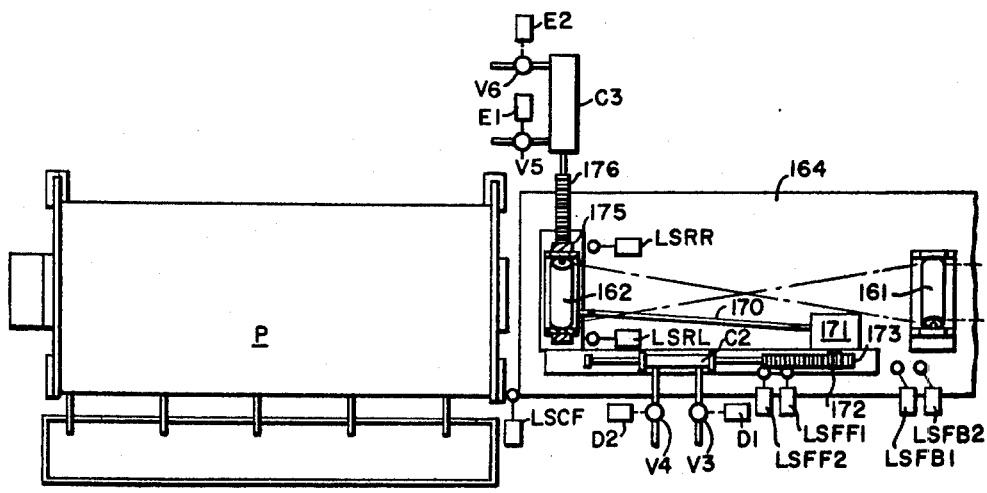
Figure 1B:
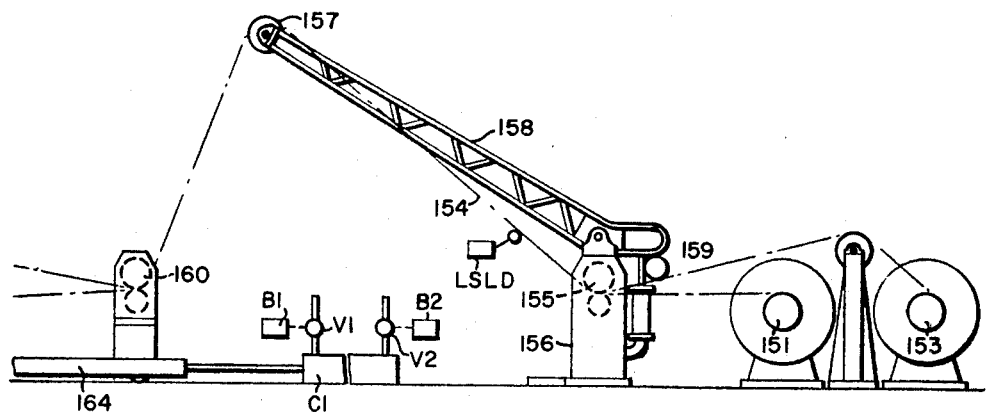
Figure 2B:
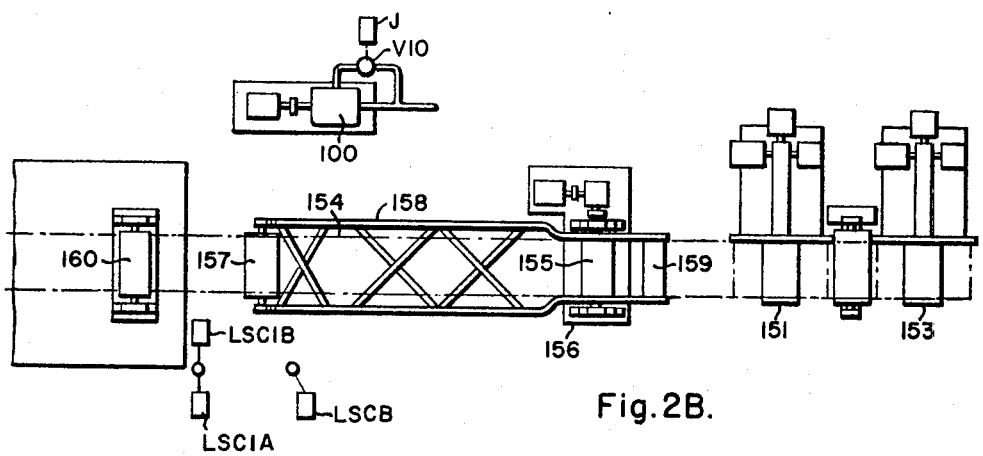
Figure 3:
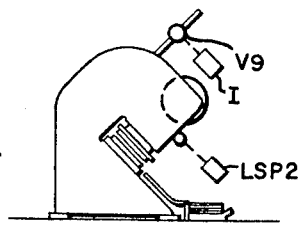
Figure 4A:
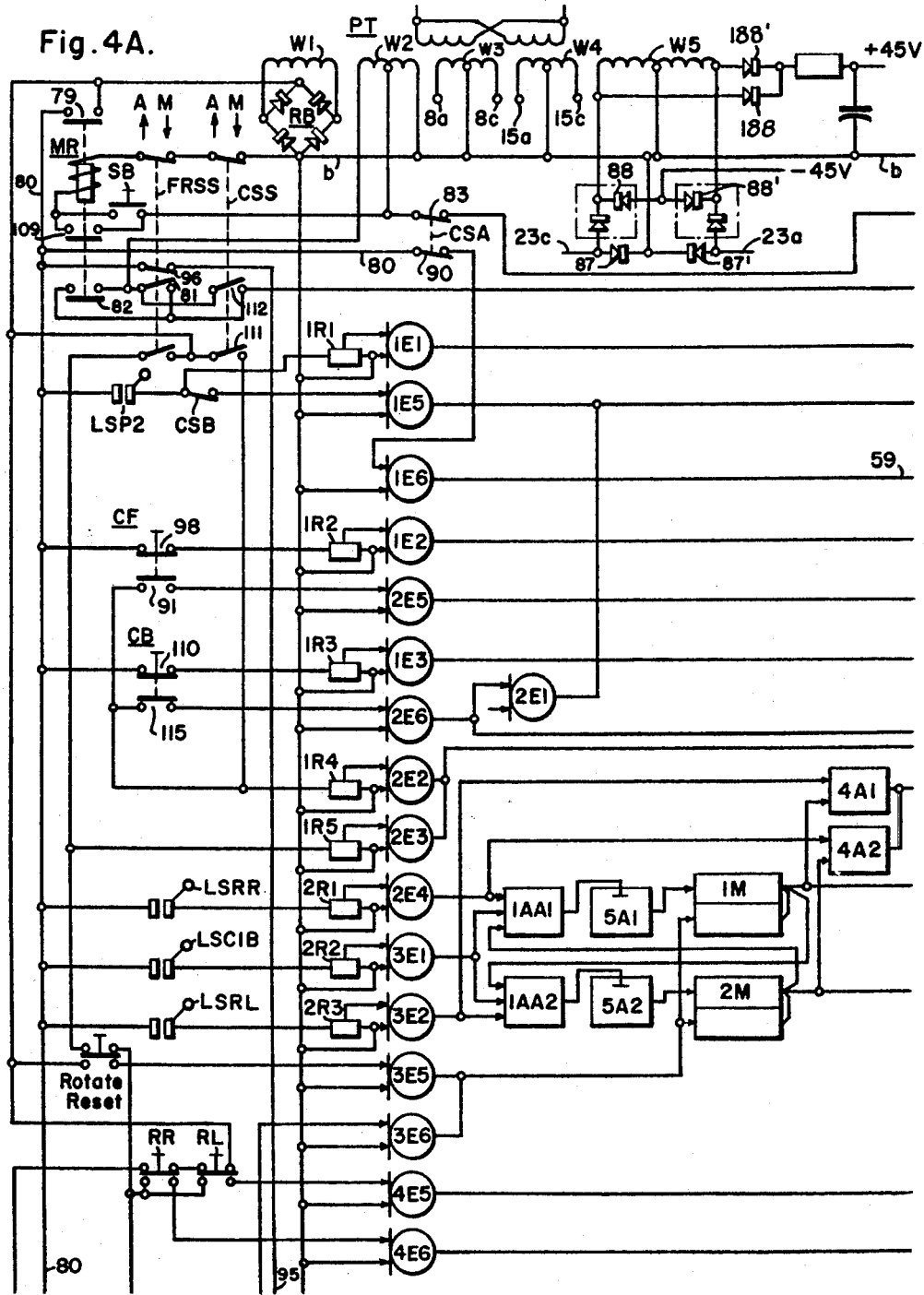
Figure 4B:
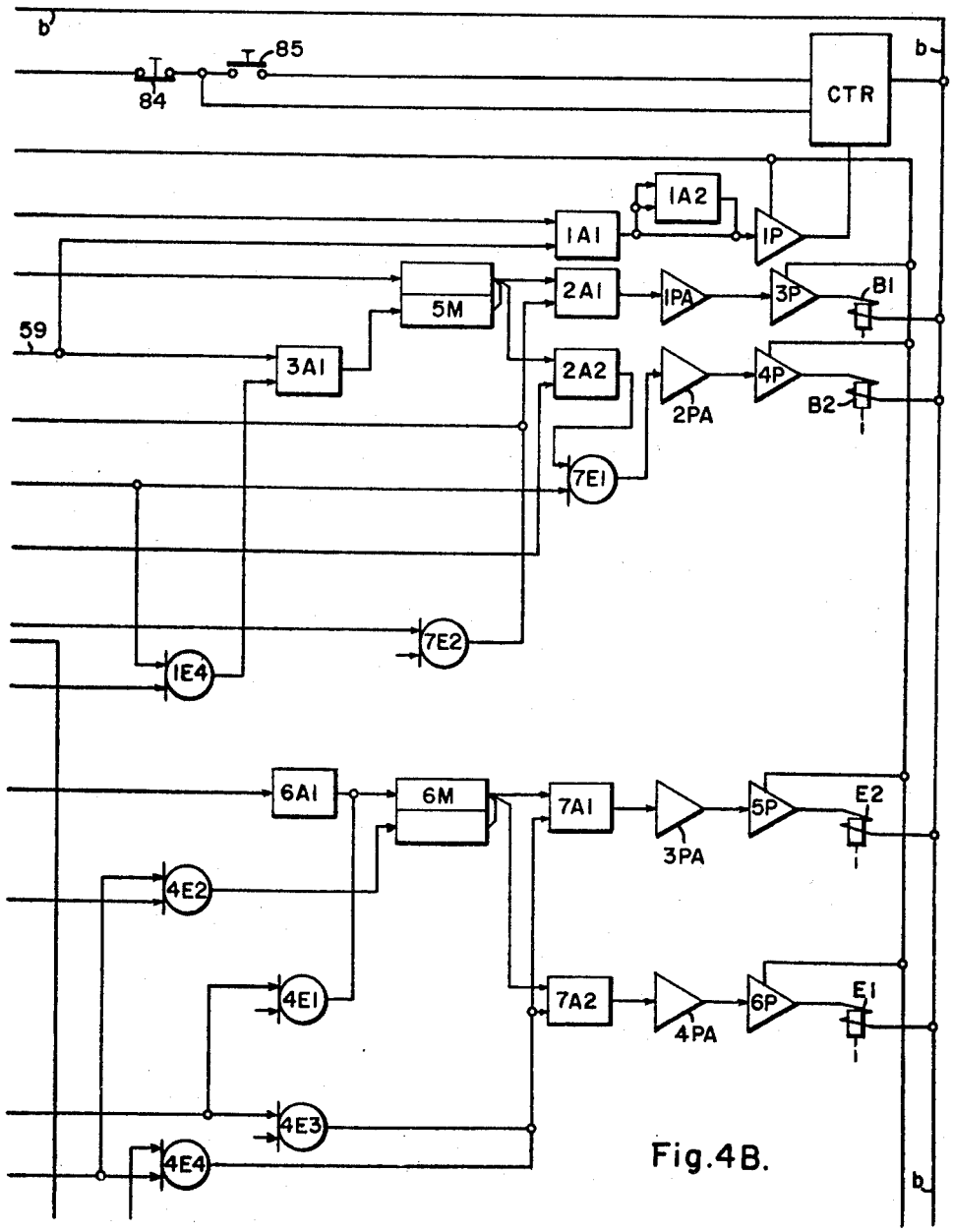
Figure 4C:
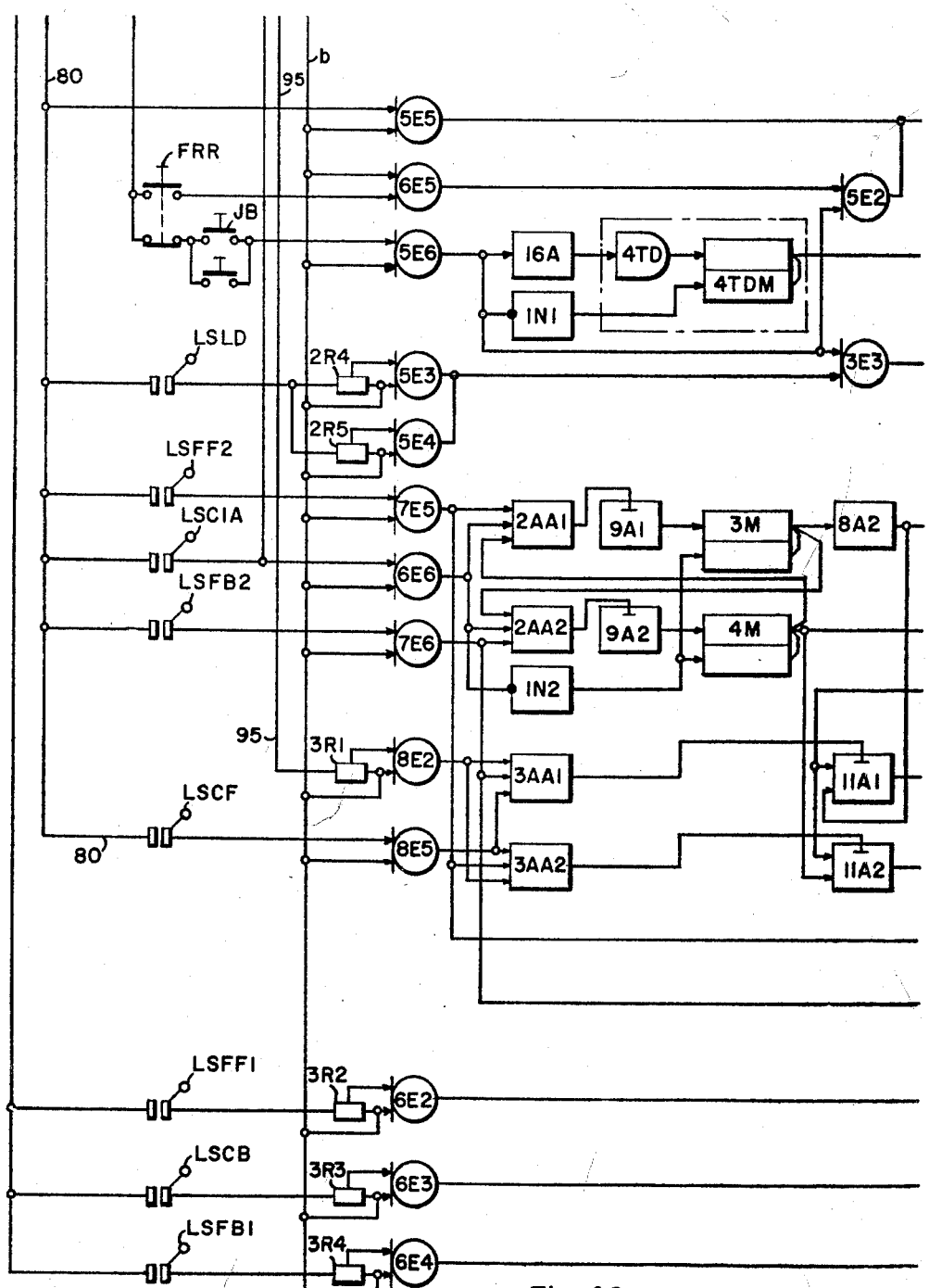
Figure 4D:
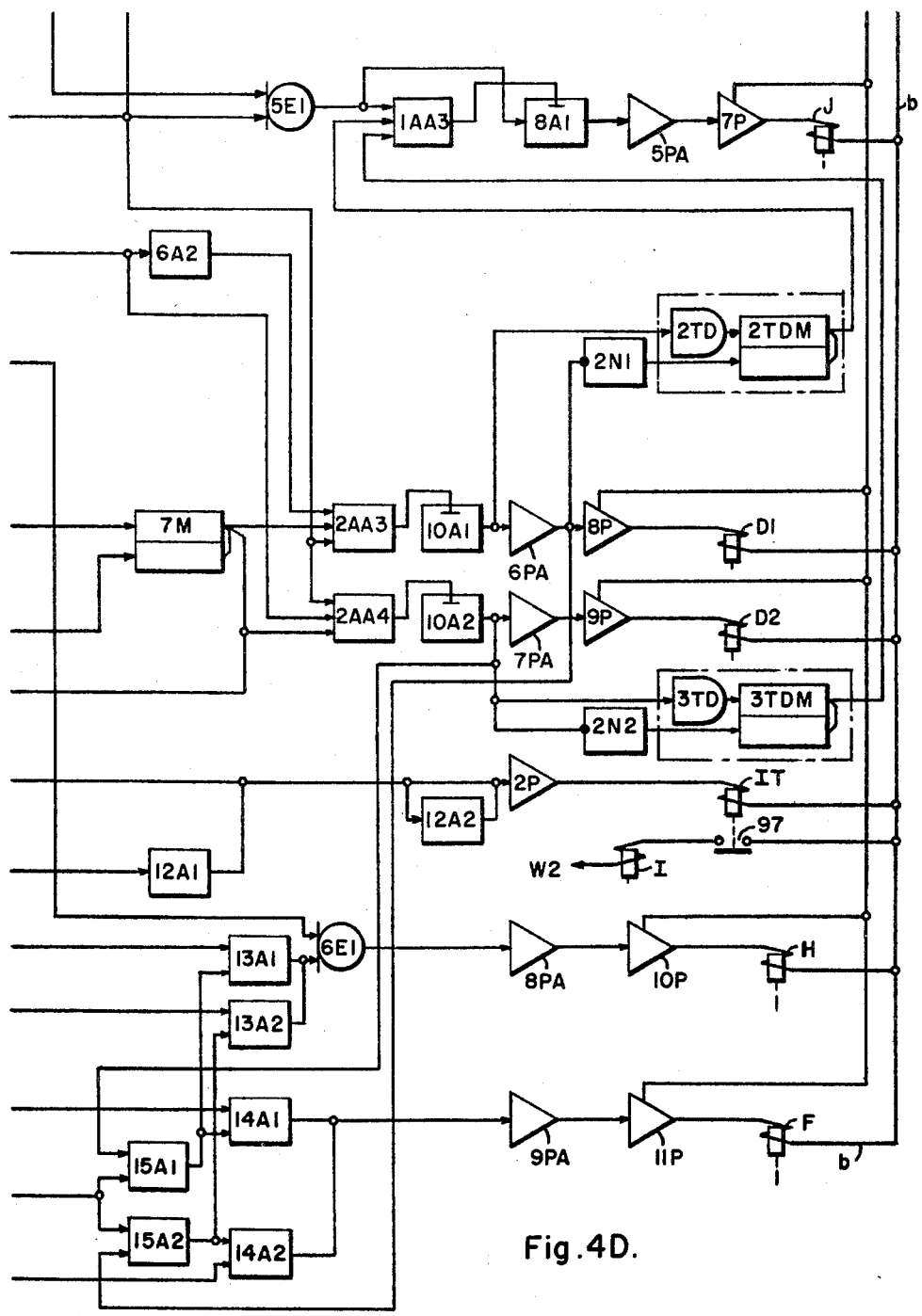
Figure 5:
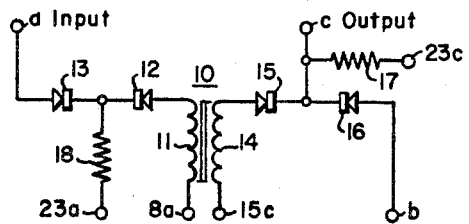
Fig. 5 is a circuit schematic of a one-input AND unit used in the control system.

The AND, NOT, OR and Memory units used in this invention are similar to those described in the July 1956 issue of Westinghouse Engineer, volume 16, No. 4, published by Westinghouse Electric Corporation, Pittsburgh, Pa., but since the AND, NOT and Memory units must have their A.C. and D.C. supply terminals connected to corresponding terminal of their power supply having the proper phases and polarities, the circuits of these units are shown by Figs. 5 to 9 of the drawings for the purpose of explaining how their connections to their A.C. and D.C. power supply terminals should be made. It is also believed to be proper to describe these logic circuits generally as follows:

An AND circuit is a circuit that responds to one or more signals having the proper phase, and has an output signal only when all of its input signals are present. The phase of its output signal is opposite to that of its input signals. A one-input AND circuit can be used for phase reversal. Fig. 5 shows a one-input AND circuit having a terminal legended Input which is indicated to receive an *a* input signal. It has a terminal legended Output which is indicated to provide a *c* output signal. The *a* and *c* signals are positive half-waves, 180° or a half-wave length apart on a time basis. The circuit of Fig. 5 has a transformer 10 with a core having a rectangular hysteresis loop, which has a reset winding 11 connected at one end through oppositely poled diodes 12 and 13 to the Input terminal, and connected at its other end to an 8-volt A.C. terminal 8*a* of the power supply. The transformer 10 has a gate winding 14 connected at one end through diode 15 to the Output terminal. The diode 15 is connected through oppositely poled diode 16 to *b* (common) terminal of the power supply. The Output terminal is connected through a resistor 17 to a negative 23-volt D.C. terminal 23*c* of the power supply. The other end of the winding 14 is connected to a 15-volt A.C. terminal 15*c* of the power supply. The junction between the diodes 12 and 13 is connected through a bias resistor 18 to the negative 23-volt D.C. terminal 23*a* of the power supply.

If the input signal is to be a *c* signal instead of an *a* signal, all power connections of Fig. 5 would be reversely connected to the power supply terminals. That is, the 23*a* and 8*a* terminals of Fig. 5 would be connected to the 23*c* and 8*c* terminals respectively of the power supply, and the 15*c* terminal of Fig. 5 would be connected to the 15*a* terminal of the power supply. Terminal 8*c* represents an 8-volt A.C. terminal and 15*a* represents a 15-volt A.C. terminal.

Control of the input of Fig. 5 is derived from the reset winding 11 magnetizing force which is opposite in phase to that of the gate winding 14. With an input missing, the core is reset and there is no output. When a voltage of the proper phase and magnitude is introduced in an input signal, the rectifier 12 is blocked when the reset current is zero so that the gate winding circuit causes the core to saturate, and to produce a half-wave output.

Figure 6:
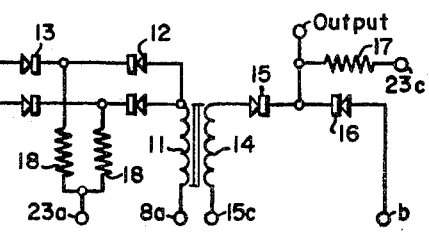
Fig. 6 is a circuit schematic of a two-input AND unit used in the control system.

Fig. 6 is a two-input AND circuit, and is similar to Fig. 5 except that another input terminal is provided, another diode 12 is provided, another diode 13 is provided, and another bias resistor 18 is provided. It operates in the same way as Fig. 5 except that signals of the same phase at both of the two inputs are required to cause an output signal.

Figure 7:
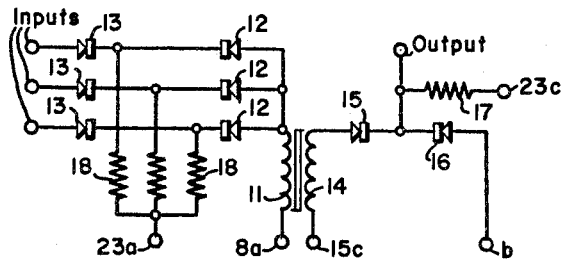
Fig. 7 is a circuit schematic of a three-input AND unit used in the control system.

Fig. 7 is a three-input AND circuit, and is similar to Fig. 6 except that another diode 12, another diode 13, and another bias resistor 18 are provided. It operates in the same way as Fig. 6 except that signals of the same phase at all three inputs are required to produce an output signal.

Figure 8:
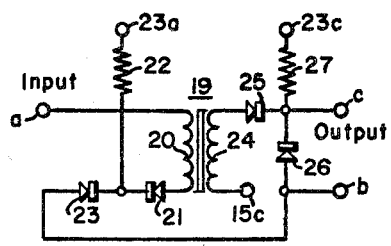
Fig. 8 is a circuit schematic of a NOT unit used in the control system.

A NOT circuit is a circuit which has substantially zero output when an input control signal of the proper phase and magnitude is applied thereto, and has an output signal when there is no proper input signal. Fig. 8 shows such a circuit, which comprises a transformer 19 having a core with a rectangular hysteresis loop, with a reset winding 20 connected at one end to an Input terminal, and at the other end through diode 21 and resistor 22 to supply terminal 23a. The diode 21 is connected through oppositely poled diode 23 to the common terminal $b$. The transformer 19 has a gate winding 24 connected at one end to the 15c supply terminal, and connected at its other end through oppositely poled diodes 25 and 26 to the $b$ terminal. The junction of the diodes 25 and 26 is connected to the Output terminal, and is connected through a resistor 27 to supply terminal 23c. No A.C. resetting voltage is used. Exciting current in the gate winding 24 causes the core to saturate when no input signal of the proper phase is present, and to produce an output signal. When an input signal of the proper phase and magnitude is present, reset current flows through the reset winding 20 which is 180° out-of-phase with the gating voltage, so that there is no output. The circuit shown is for receiving an $a$ input signal. If a $c$ signal is to be received, the connection to power supply connection 23a would be changed to 23c, and the connection to 15c would be changed to 15a.

Figure 9:
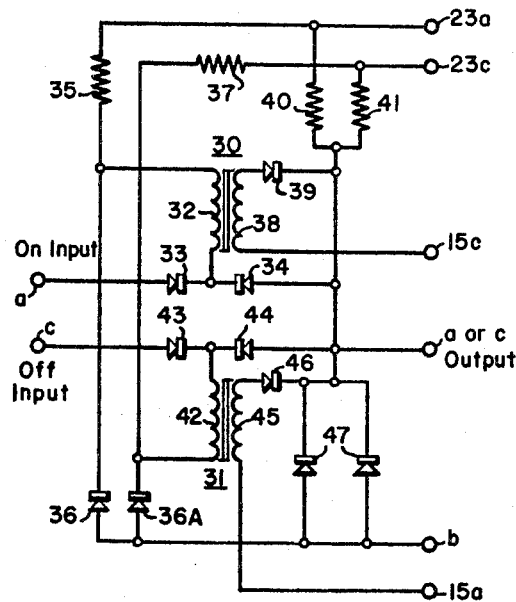
Fig. 9 is a circuit schematic of a Memory unit used in the control system.

A Memory circuit is a bistable circuit that, in response to a first input signal, produces an output signal that is maintained even though the first signal has ended. The Memory circuit is reset, and the output signal is terminated in response to a second input signal having the opposite phase to the first signal. Fig 9 shows a Memory circuit having transformers 30 and 31 with cores having rectangular hysteresis loops. The transformer 30 has a reset winding 32 connected at one end through diode 34 to the Output terminal. The winding 32 is connected at its other end through resistor 35 to the 23a supply terminal, and connected through diode 36 to the $b$ connection. The gating winding 38 of the transformer 30 is connected through diode 39 and resistor 40 to the 23a supply terminal, and through resistor 41 to the 23c supply terminal. The other end of the winding 38 is connected to the 15c supply terminal.

The transformer 31 has a reset winding 42 connected through diode 43 to the Input terminal shown as having a $c$ input, and through diode 44 to the Output terminal. The other end of the winding 42 is connected through the diode 36A to the $b$ terminal, and through resistor 37 to the 23c supply terminal.

The Memory circuit is seen to consist of two NOT circuits which are sensitive to opposite phase input signals. A continuous $c$ output signal occurs when the first input signal $c$ occurs, and the $c$ output is stopped and an $a$ continuous output is provided when the second input signal $a$ occurs. The NOT circuits are connected in parallel, but the A.C. voltages are so phased that one of the two cores is gating while the other is resetting. The common output voltage is fed back to the common control circuit so that the output of one NOT circuit serves as the input to the other. Once an output has been established, a signal is continuously provided to maintain this output without the necessity of applying an external signal. If the input terminal shown receiving an $a$ input signal is to receive a $c$ input signal, and the input terminal shown receiving a $c$ input signal is to receive an $a$ signal, then the power supply terminals having $a$ and $c$ suffixes would be reversed.

It is convenient to describe a Memory unit as turned on when an input signal of one phase is supplied, and to be turned off when an input signal of the opposite phase is supplied, and this description will be used in the following explanations. When a Memory unit is on, it will be said to supply a signal from its on side. When a Memory unit is off, it will be said to supply a signal from its off side.

An OR circuit supplies an output signal when any input signal is applied. It requires no A.C. or D.C. power supply connections, and so is not shown. It may have only a single input in which case it acts like a diode. It is used for isolation between signals.

A Preamplifier is phase sensitive, and requires different connections to the power supply when differently phased input signals are used to turn it on. It is similar in design to two one-input AND circuits with their outputs tied together. The input to one of its AND units is the input to the Preamplifier. The input to its other AND unit comes from the output of the first AND unit. Therefore one AND circuit supplies an $a$ output signal while the other supplies a $c$ output signal, the two together supplying the full-wave rectified signal required by a following Magnetic Amplifier.

Figure 10:
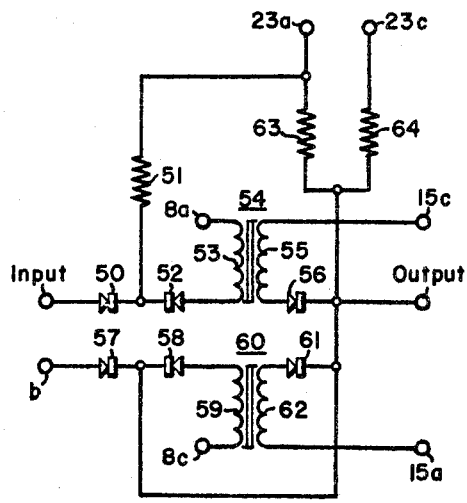
Fig. 10 is a circuit schematic of a Preamplifier unit used in the control system.

The Input terminal of the Preamplifier of Fig. 10 is connected through diode 50 and resistor 51 to a 23a supply terminal, and is connected through the diode 50 and reversely poled diode 52 to one end of reset winding 53 of transformer 54, the other end of which is connected to an 8a supply terminal. The transformer has a gate winding 55 connected at one end to the supply terminal 15c, and at its other end through diode 56 to the Output terminal. The Common terminal is connected through diode 57 and reversely poled diode 58 to one end of reset winding 59 of transformer 60, the other end of the winding 59 being connected to the 8c supply terminal. The junction of the diodes 57 and 58 is connected through diode 61 to one end of gate winding 62 of the transformer 60, and is connected to the Output terminal and to the junction of series connected resistors 63 and 64, one of which is connected to the 23a terminal, and the other of which is connected to the 23c terminal. The other end of the winding 62 is connected to supply terminal 15a. The Preamplifier of Fig. 10 is shown as receiving an $a$ input signal. If the input signal to turn the Preamplifier on is to be a $c$ signal, the connections 23a and 23c, the connections 15a and 15c, and the connections 8a and 8c would be reversed from those shown.

The power supply for the logic units as will be described later in detail, has supply connections with reference characters applied thereto corresponding to those referred to in the foregoing, and the logic units referred to in the following will be shown on the drawings as receiving $a$ or $c$ input signals so that it can be understood how the logic units should be connected to the proper A.C. and D.C. supply connections.

The Magnetic Amplifiers shown by the drawings are conventional, and are widely used, so that it is not believed that details of their construction and connections to the power supply need be shown. They are turned on when their respective preamplifiers are turned on.

Referring now to Figs. 1A, 1B, 2A, 2B and 3 of the drawings, pay-out reels 151 and 153 supply a steel strip 154 to be notched and sheared. The strip 154 on leaving the reel 151 passes between pinch rolls 155 on a stand 156, and then over a roll 157 on the upper end of a tension control arm 158, which is pivoted near its lower end to the top of the stand 156. The lower end of the arm 158 in its lowermost position contacts a stop roller 159. The strip 154 after leaving the roller 157 passes downwardly between a pair of horizontal billy rolls 160 and then between a pair of 45° billy rolls 161. The strip next moves between a pair of feed rolls 162 which deliver the strip into a press P.

The rolls 160, 161 and 162 are supported on a carriage 164 which is movable on rollers 165. The carriage is movable forwardly (towards the press) and rearwardly, by a piston in a cylinder C1 (shown schematically) into which compressed air or another fluid under pressure is applied through valves V1 or V2 which are controlled by solenoids B1 and B2 respectively. The valves V1 and V2 admit fluid into the cylinder C1 on opposite sides of its piston so as to move the carriage in opposite directions. The cylinder C1 has, of course, the appropriate length to accomplish its purpose.

The feed rolls 162 are rotated through a shaft 170 which is rotated through a gear box 171 having a pinion gear 172 meshed with a gear rack 173. The rack 173 is movable by a piston in a cylinder C2 into which compressed air is supplied through valve V3 or V4 which are controlled by solenoids D1 and D2 respectively. The valves V3 and V4 admit air into the cylinder C2 on opposite sides of its piston. When valve V3 is open and valve V4 closed, the feed rolls are rotated about their axes in a direction to feed the strip forward. When the valve V3 is closed and the valve V4 opened, the rack 173 is moved in the opposite direction, but the feed rolls are again rotated about their axes to feed another length of strip forward. The feed rolls are ratcheted such that they always turn in the same direction regardless of the direction of movement of the rack 173.

The feed rolls 162 are journalled within a ring gear 175 which is meshed with a gear rack 176 which is moved by a piston in cylinder C3 into which compressed air is supplied through valves V5 or V6 which are controlled by solenoids E1 and E2 respectively. The valves V5 and V6 admit air into the cylinder C3 on opposite sides of its piston.

A valve V7 is connected in a compressed air supply line to a cylinder (not shown) which applies a brake (not shown) to the feed rolls 162 for slowing down their motion. The valve V7 is controlled by a solenoid F. A valve V8 is also connected in the air supply to the brake cylinder, and is controlled by a solenoid H. When the valve V8 is opened, the feed rolls are braked to a stop.

Another cylinder (not shown) within the press P, actuates the press to shear the strip, and is supplied with compressed air through a valve V9 which is controlled by a solenoid I.

Another valve V10 is connected in a bypass line connected to the compressed air supply line from the air compressor 100, and when opened by a solenoid J, reduces the air pressure from the compressor to the air cylinders.

A limit switch LSLD is closed when slack occurs in the strip 154 as it passes onto the tension control arm 158.

A limit switch LSCF is closed when the carriage 164 is fully forward. A limit switch LSCB is closed when the carriage is fully retracted. A limit switch LSC1A is closed when the carriage reaches in intermediate forward position, and a limit switch LSC1B is closed when the carriage reaches an intermediate back position. Limit switch LSFF1 is closed when the rack 173 approaches its forward position, and limit switch LSFF2 is closed when the rack 173 reaches its forward position. Limit switch LSFB1 is closed when the rack 173 approaches its back position, and limit switch LSFB2 is closed when the rack reaches its back position.

A limit switch LSP2 is closed when the press P reaches the end of its shear stroke.

Limit switch LSRR is closed when the feed roll ring gear 175 reaches its extreme right position, and limit switch LSRL is closed when the ring gear 175 reaches its extreme left position.

The components described so far in connection with Figs. 1A, 1B, 2A, 2B and 3 are conventional.

Referring now to Figs. 4A, 4B, 4C and 4D, a power supply for the logic units and the Magnetic Amplifiers used therewith, consists of a transformer PT having a secondary winding W1 connected to the input of a rectifier bridge RB, one output side of which is connected to a $b$ (common) bus, and the other output side of which is connected through switch 79 of the master relay MR to signal supply bus 80 which supplies full-wave, positive pulses, alternate of which are $a$ signals, and the others of which are $c$ signals, the $a$ and $c$ signals being displaced 180° on a time basis. The limit switches are connected to the bus 80.

Another secondary winding W2 is connected at one end to the bus $b$, and at its other end to contact 81 of feed roll selector switch FRSS, and to switch 82 of the master relay MR. A tap on the winding W2 is connected through switch 83 of selector switch CSA, switches 84 and 85, and to a counter CTR which also is connected to bus $b$ and to magnetic amplifier 1P. Another secondary winding W3 has its ends connected to supply 8 volts A.C. to the 8$a$ and 8$c$ terminals of the logic units, and has a centertap connected to the bus $b$. Another secondary winding W4 has its ends connected to the 15$a$ and 15$c$ terminals of the logic units, supplying 15 volts A.C. to the logic units, and has a centertap connected to the bus $b$. Another secondary winding W5 has its ends connected as indicated to the 23$a$ and the 23$c$ terminals of the logic units, supplying negative 23 volts D.C. to these logic units. Oppositely poled diodes 87 and 87′ are connected in series between the 23$a$ and 23$c$ leads of W5, and their junction is connected to the bus $b$. Oppositely poled diodes 88 and 88′ are connected in series between the ends of the winding W5, and their junction is connected to supply the −45 volt D.C. to the terminals of the magnetic amplifiers, and oppositely poled diodes 188 and 188′ are connected in series between the ends of winding W5, and their junction is connected to supply the +45 volt D.C. to the circuitry shown.

Feed roll selector switch FRSS and carriage selector switch CSS when in up positions are set for Automatic operation, and when in down positions are set for Manual operation.

Assume that the switches FRSS and CSS are set for Automatic operation, and that the switch CSB is set for Rotate. Also assume that the carriage 164 is retracted and that the feed rolls 162 have been rotated bodily to their extreme left position by the ring gear 175. Limit switches LSP2, LSRR, LSC1A, LSFF1, LSFF2 and LSCF are open. Limit switches LSC1B, LSFB1, LSFB2, LSRL and LSCB are closed. Solenoids F and H are energized through limit switches LSFB1 and LSFB2 as will be described later, so that the brakes are on the feed rolls.

Resistors 1R1, 1R2, 1R3, 1R4, 1R5, 2R1, 2R2, 2R3, 2R4, 2R5, 3R1, 3R2, 3R3 and 3R4 are provided for reducing the voltage from the signal supply bus 80 to the proper value for the following OR units to which they are connected.

Depressing the cycle start push-button SB energizes the master relay MR causing it to close its switch 109, to establish a holding circuit around SB, and to close its switch 82 to supply power to the magnetic amplifiers, and to close its switch 79 to energize the signal supply bus 80 from the rectifier RB. A signal from bus 80 is carried through switch 90 of selector switch CSA, OR unit 1E6, conductor 59 to two-input AND unit 3A1. 3A1 receives its other signal through OR unit 1E4 and from two-input AND unit 4A1. 4A1 receives one $c$ signal from closed limit switch LSRL, and receives another $c$ signal from the on side of Memory unit 1M. The AND unit 3A1 supplies an output signal which turns on Memory unit 5M, the $c$ output of which is supplied to two-input AND unit 2A2 which receives another $c$ signal from closed carriage back switch 110 through OR unit 1E3. The AND unit 2A2 supplies an output signal through OR unit 7E1 which turns on Preamplifier 2PA which then turns on magnetic amplifier 4P which energizes the carriage forward solenoid B2 which opens valve V2 to admit compressed air into the cylinder C1 to move the carriage 164 forward.

When the carriage reaches an intermediate forward position, it closes the limit switch LSC1A which supplies a signal through OR unit 6E6 to three-input AND unit 2AA2 which receives another signal through OR unit 7E6 from closed limit switch LSFB2, and another signal from the off side of Memory unit 3M. The AND unit 2AA2 supplies an output signal through one-input AND unit 9A2 which turns Memory unit 4M on. When 4M turns on it deenergizes the brake solenoids F and H by removing the input signal from AND unit 10A2 which is used to energize F and H as will be described later. When 4M turns on it also supplies a signal to three-input AND unit 11A2, and supplies a signal to turn Memory unit 7M on. 7M then supplies a $c$ signal to three-input AND unit 2AA4 which receives another signal from the off side of Memory unit 4TDM, and receives its third signal through OR unit 5E5 from the bus 80. The AND unit 2AA4 then supplies a signal through one-input AND unit 10A2 to turn Preamplifier 7PA on which turns magnetic amplifier 9P on to energize the forward feed solenoid D2. The latter then opens the valve V4 admitting compressed air into the cylinder C2 to cause the rack 173 to move forwardly for rotating the feed rolls for sending the strip into the press. The NOT unit 1N2 is energized from the OR unit 6E6 at this time and has no output signal. When it has an output signal it turns Memory units 3M and 4M off. When Memory unit 7M is turned on, it energizes the retract feed solenoid D1 through a circuit which will be described later. When the intermediate forward limit switch is opened it removes through OR unit 6E6, the on signal from the NOT unit 1N2 which turns off and supplies a signal to turn 3M and 4M off.

As the rack 73 approaches the end of its forward travel, the limit switch LSFF1 is closed to slow the feed rolls, and supplies a signal through OR unit 6E2 to two-input AND unit 14A1 which receives another input signal from two-input AND unit 15A1 which receives one input signal from the previously mentioned AND unit 10A2, and another input signal through OR unit 6E3 from limit switch LSCB. 14A1 supplies an output signal to turn Preamplifier 9PA on which turns magnetic amplifier 11P on to energize the slow down solenoid F. Solenoid F then opens the valve V7 to admit compressed air to operate the brake on the feed rolls to slow them down. Next, the limit switch LSFF2 will be closed by the rack 173, and will act to brake the feed to a stop by applying a signal through OR unit 7E5 to one input of two-input AND unit 13A1 which receives another input signal from the AND unit 15A1, and acts through OR unit 6E1 to turn Preamplifier 8PA on which turns magnetic amplifier 10P on to energize the brake solenoid H which opens the valve V8 to cause the feed roll brake to be applied to stop the feed rolls. The OR unit 7E5 also supplies a signal to AND unit 2AA1 which has one input signal from Memory unit 4M, and which has its third input signal from limit switch LSC1A supplied through OR unit 6E6.

At this time, the limit switch LSFF2 is closed, and supplies a signal through OR unit 7E5 to one input of three-input AND unit 3AA2 which receives another signal from closed limit switch LSCF through OR unit 8E5, and which receives its third input signal through OR unit 8E2 and conductor 95 from switch 96 of feed roll selector switch FRSS. The AND unit 3AA2 then supplies an output signal to three-input AND unit 11A2 which receives another signal from the Memory unit 4M, and its third input signal from the Memory unit 7M. 11A2 then supplies an output signal through one-input AND unit 12A1 to turn Preamplifier 2P on, causing the latter with AND unit 12A2 to supply $a$ and $c$ signals to energize Timer IT which closes switch 97 to energize the solenoid I by connecting it to winding W2 and bus $b$. The solenoid I then opens the valve V9 which supplies compressed air to start the press cycle.

When the press P makes a stroke, the limit switch LSP2 closes and supplies a signal through OR unit 1E5 to turn off Memory unit 5M which then supplies an $a$ signal to two-input AND unit 2A1 which receives another signal through OR unit 1E2 from carriage forward CF switch 98. 2A1 then supplies an output signal to turn Preamplifier 1PA on which turns magnetic amplifier 3P on to energize the carriage retract solenoid B1 which opens valve V1, supplying compressed air into the cylinder C1 to move the carriage 164 back. At this time, since the $c$ output from Memory unit 1M which caused carriage forward solenoid B2 to be energized, is missing, B2 is deenergized. Likewise, when Memory unit 5M is turned on to energize B2, its $a$ output is missing, and B1 is deenergized. When the carriage reaches an intermediate back position, limit switch LSC1B closes, thereby initiating a rotation of the feed rolls to turn the strip as follows:

At the start, it was assumed that the rotation of the feed rolls to turn the strip would be to the right which would mean that the limit switch LSRR would be closed and the limit switch LSRL would be open. LSRR would supply one output signal through OR unit 2E4 to three-input AND unit 1AA1 which receives another signal through OR unit 3E1 from the limit switch LSC1B, and which receives its third signal from the off side of Memory unit 2M. 1AA1 then supplies an output signal through AND unit 5A1 to turn Memory unit 1M on. When 1M comes on, it supplies an off signal to one input of three-input AND unit 1AA2 which prevents it from functioning and supplying an output signal when the rotation of the feed rolls to the left has been completed.

The Memory unit 1M also supplies a signal through AND unit 6A1 which then turns Memory unit 6M on which supplies an output signal through two-input AND unit 7A1 to turn Preamplifier 3PA on which turns magnetic amplifier 5P on to energize the solenoid E2. 7A1 gets its other signal through OR units 5E5 and 4E4 from the signal supply bus 80. Solenoid E2 opens valve V6 to admit compressed air into the cylinder C3 to cause the rack 176 to rotate the ring gear 175 to turn the feed rolls to the left for turning the strip over to the left. At this time, the carriage is back and remains back until the rotation of the strip to the left has been completed.

When the carriage reaches its intermediate forward position, limit switches LSC1A and LSFF2 supply signals to three-input AND unit 2AA1, which as previously mentioned, receives a third signal from Memory unit 4M. 2AA1 supplies an output signal through AND unit 9A1 which turns Memory unit 3M on. When 3M comes on, it removes its signal to the AND unit 2AA2 turning it off, and supplies a signal to turn Memory unit 7M off. 7M then supplies a signal to three-input AND unit 2AA3 which receives another signal from Memory unit 4TDM, and a third signal from the bus 80 through OR unit 5E5. 2AA3 then supplies a signal through AND unit 10A1 to turn Preamplifier 6PA on which turns magnetic amplifier 8P on to energize the retract feed solenoid D1 which opens valve V3 admitting compressed air into the cylinder C2 to cause the rack 173 to retract for receiving another length of strip. The forward feed solenoid D2 is deenergized at this time as a result of the AND unit 2AA2 being off.

When the feed rack 173 approaches its back position, limit switch LSFB1 is closed to slow down the feed rolls, and limit switch LSFB2 is closed to stop the feed rolls. LSFB1 supplies a signal through OR unit 6E4 to two-input AND unit 14A2 which receives another signal from two-input AND unit 15A2. 15A2 receives one input signal from Preamplifier 6PA, and its other input signal from limit switch LSCB through OR unit 6E3. 14A2 then turns on Preamplifier 9PA which turns on magnetic amplifier 11P which energizes the slow down solenoid F which opens valve V7 to supply compressed air to operate the brake on the feed rolls to slow them. Next, the limit switch LSFB2 will be closed by rack 173, and will act to brake the feed rolls to a stop by applying a signal through OR unit 7E6 to two-input AND unit 13A2 which receives another input signal from the AND unit 15A2. 13A2 then supplies a signal through OR unit 6E1 to turn Preamplifier 8PA on which turns magnetic amplifier 10P on to energize the brake solenoid H which opens valve V8 to cause the feed rolls to be braked to a stop.

Limit switch LSCB opens when the carriage is fully back, and turns off the AND unit 15A2 causing the brake solenoids F and H to be deenergized.

When the rotation of the feed rolls to the left has been completed, the limit switch LSRL will be closed but the AND unit 1AA2 cannot supply a signal to Memory unit 2M because one signal to 1AA2 (the signal from the off side of Memory unit 1M) was removed when 1M was turned on. When the limit switch LSRL closes, it supplies a signal through OR unit 3E2 to two-input AND unit 4A1, and that signal along with a signal from 1M, causes 4A1 to supply an output signal through OR unit 1E4 to two-input AND unit 3A1. This signal along with a signal from OR unit 1E6 provided through closed switch 90 when the master relay MR was energized at the start, turns 3A1 on which then supplies a signal to turn Memory unit 5M on. 5M then delivers a c signal to two-input AND unit 2A2 which receives another signal through OR unit 1E3 from carriage back switch 110. 2A2 then supplies a signal through OR unit 7E1 to turn Preamplifier 2PA on which turns magnetic amplifier 4P on to energize the carriage forward solenoid B2. B2 then again opens the valve V2 to supply compressed air into the cylinder C1 causing it again to move the carriage forward.

When the carriage reaches its intermediate forward position, the limit switch LSC1A closes and supplies a signal through OR unit 3E6 to turn the Memory units 1M and 2M off.

In a previous operation, the feed forward solenoid D2 was energized by a signal from the AND unit 10A2, and if that signal is held too long (20–30 seconds), 10A2 will supply a signal to timer 3TD which will turn Memory unit 3TDM on which then removes its output signal from AND unit 1AA3 turning it off, and removing its output signal from AND unit 8A1 which turned the Preamplifier 5PA on to turn magnetic amplifier 7P on which energized the unloading valve solenoid J. When the solenoid J is deenergized, it opens the valve V10 which is in a bypass around the air compressor 100, reducing the air pressure from the latter so as to relieve the pressure on the pistons in the air cylinders.

When the AND unit 10A2 supplies a signal to 3TD, it also supplies a signal to turn NOT unit 2N2 on, preventing it from turning the Memory unit 3TDM off. When the signal from 10A2 is missing, 2N2 is turned off and supplies an output signal to turn 3TDM off.

The retract feed solenoid D1 is energized by a signal from the AND unit 10A1, and if that signal is held too long, 10A1 will supply a signal through timer 2TD to Memory unit 2TDM which will operate and remove one of the signals from 1AA3 causing it to turn off and to cause the solenoid J to be deenergized.

A NOT unit 2N1 is provided to turn 2TDM off after 2TD has timed out and has been reset. 2N1 has its input connected to the output of the Preamplifier 6PA, and has its output connected to the off input terminal of 2TDM.

As described in the foregoing, the carriage on its way back, closes the limit switch LSC1B when it reaches an intermediate back position, and signals from the limit switches LSC1B and LSRR and an off signal from Memory unit 2M turn on Memory unit 1M to cause the feed rolls to rotate the strip to the left. Limit switch LSRL will be closed and limit switch LSRR will be open. Then, on the next trip of the carriage back, signals from the limit switches LSC1B and LSRL and from the Memory unit 1M will turn on the AND unit 1AA2 which will turn on the Memory unit 2M to cause the feed rolls to again rotate the strip to the right. 2M causes the rotation of the feed rolls to the right by supplying a signal through OR unit 4E2 to turn the Memory unit 6M off so that it supplies a c signal to turn two-input AND unit 7A2 on, causing the latter to turn Preamplifier 4PA on which turns magnetic amplifier 6P on to energize the solenoid E1. E1 then opens the valve V5 to admit compressed air into the cylinder C3 to cause the ring gear 175 to be rotated by the rack 176 to rotate the feed rolls to the right. The AND unit 7A2 receives its other input signal through OR units 5E5 and 4E4 from the signal supply bus 80.

When the rotation of the feed rolls to the right has been completed, the limit switch LSRR will be closed but the AND unit 1AA1 cannot supply a signal to Memory unit 1M because one signal to 1AA1 (the signal from the off side of 2M) was removed when 2M was turned on.

Turning the feed roll selector switch FRSS or the carriage selector switch CSS to manual position, deenergizes the master relay MR. Operation of the feed rolls is placed on the manually operated rotate right push-button RR or on the manually operated rotate left push-button RL.

When the switch FRSS is on manual position, depressing the push-button RR sends a signal through OR units 4E6 and 4E2 to turn Memory unit 6M off, and supplies a signal to AND 7A2. The output from the OR unit 4E6 is also supplied through OR unit 4E4 to the other input of 7A2. 7A2 turns on Preamplifier 4PA which turns on magnetic amplifier 6P to energize the rotate right solenoid E1. Depressing the RL push-button sends a signal through OR units 4E5 and 4E1 to turn Memory unit 6M on causing it to supply a signal to the AND unit 7A1 which receives another signal from 4E5 through 4E3, and supplies a signal to turn Preamplifier 3PA which turns magnetic amplifier 5P on to energize the rotate left solenoid E2.

Turning the carriage selector switch CSS to manual position, closes one switch 112 which supplies A.C. to the magnetic amplifiers, and closes another switch 111 which sets up the logic circuit to the carriage back push-button switch 115 or the carriage forward push-button switch 91. Depressing the carriage forward push-button CF applies a signal through OR units 2E5 and 7E1 to turn Preamplifier 2PA on to turn magnetic amplifier 4P on to energize the carriage forward solenoid B2. Depressing the carriage back push-button CB closes switch 115 which applies a signal through OR units 2E6 and 7E2 to AND unit 2A1 which turns Preamplifier 1PA on to turn magnetic amplifier 3P on to energize the carriage retract solenoid B1. 2A1 gets its other input signal from Memory unit 5M.

With the feed roller selector switch FRSS on manual position, the operator upon depressing feed roll run push-button FRR, supplies a signal through OR units 6E5, 5E2 and 4E4 to AND units 7A2 and 7A1, one of which operates when the other signal to which it is phased is supplied by Memory unit 6M. An a signal from 6M would cause 7A1 to supply a signal to turn Preamplifier 3PA on to turn magnetic amplifier 5P on to energize rotate left solenoid E2, and a c signal from 6M would cause 7A2 to turn Preamplifier 4PA on to turn magnetic amplifier 6P on to energize the rotate right solenoid E1.

At this time, a signal is supplied from OR unit 5E2 and 5E1 to AND unit 1AA3 to cause AND unit 8A1 to turn Preamplifier 5PA on to turn magnetic amplifier 7P on to again energize the unloading valve solenoid J to get the high pressure from the compressor 100.

Depressing the jog push-button JB supplies a signal through OR unit 5E6 and AND unit 16A to start timer 4TD timing, and at the same time, OR unit 5E6 supplies a signal through OR units 3E3 and 6E1 to turn preamplifier 8PA on to turn magnetic amplifier 10P on to energize the brake solenoid H, and supplies a signal through OR units 5E2 and 5E1, and AND unit 8A1 to turn Preamplifier 5PA on to turn magnetic amplifier 7P on to energize the unloading valve solenoid J. The brake is on during jogging.

When timer 4TD times out, it applies a signal to turn Memory unit 4TDM on and NOT unit 1N1 off, supplying a signal to AND unit 6A2 which delivers a signal to AND units 2AA3 and 2AA4, causing 2AA3 to act through AND unit 10A1 to turn Preamplifier 6PA on to turn magnetic amplifier 8P on to energize the retract feed solenoid D1, or causing 2AA4 to act through AND unit 10A2 to turn Preamplifier 7PA on to turn magnetic amplifier 9P on to energize the forward feed solenoid D2, depending upon which of the limit switches LSFF1 or LSFB1 is closed. When the NOT unit 1N1 is on, it turns 4TDM off.

The loop down limit switch LSLD is closed when the regulator arm 158 comes down, indicating too much tension in the strip 154, and applies a signal through OR units 5E3, 3E3 and 6E1 to turn Preamplifier 8PA on to turn magnetic amplifier 10P on to energize the brake solenoid H to slow down the feed rolls.

The counter CTR is provided to count the number of laminations during continuous operation only. Each time the press P operates, its limit switch LSP2 closes and sends a signal through OR unit 1E1 to two-input AND unit 1A1 which receives another signal through OR unit 1E6 and switch 90 from the signal bus 80. 1A1 then supplies a c signal to magnetic amplifier 1P which is supplied with an a signal from AND unit 1A2 providing the D.C. input necessary to turn 1P on to trigger the counter CTR.

It will have been noted that since the motions are repetitive, a signal from one operation is accepted to rotate or feed the strip, and the system must hold this signal until the next cycle is initiated by the press or by the carriage position. AND units 1AA1 and 1AA2 receive one of their inputs from Memory units 2M and 1M respectively. Assuming the strip is rotated left, closing limit switch LSRL, then the carriage motion back closes LSC1B causing 1AA2 to accept a signal and turn on the Memory unit 2M. Operation of 2M removes one of the inputs from 1AA1 and at the same time, initiates the rotate to right signal. At the end of right rotation, LSRR will be closed but 1AA1 will not produce an output because one of its inputs is missing. Movement of the carriage forward resets the Memory units 1M and 2M. Then on the next motion of the carriage back, LSC1B is closed, causing 1AA1 to accept a signal and turn on Memory unit 1M. Operation of 1M removes one of the inputs from 1AA2 and at the same time initiates the rotate to the left signal. At the end of the left rotation, LSRL will be closed but 1AA2 will not produce an output since one of its inputs is missing. The next movement of the carriage forward again resets the Memory units 1M and 2M so that rotation of the strip to the right can be accomplished on the next trip of the carriage back.

What is claimed is:

1. In a system for feeding a strip forwardly including a carriage for moving said strip, first means for moving said carriage alternately forward and back, feed rolls on said carriage, means for driving at least one of said feed rolls about its axis to advance the strip forwardly of said carriage, second means for oscillating the axes of said rolls to turn said strip alternately to the left and right, a first limit switch operated each time said carriage reaches an intermediate forward position, a second limit switch operated each time said carriage reaches an intermediate position back, a third limit switch operated when said second means has rotated said rolls to the left, and a fourth limit switch operated when said second means has rotated said rolls to the right, the combination of signal supply means connected to said switches, means including a first Memory unit for causing said second means to rotate said rolls to the left, means including a three-input AND unit for turning said Memory unit on, means including a second Memory unit for causing said second means to rotate said rolls to the right, means including a second three-input AND unit for turning said second Memory unit on, means including means supplying an off signal from said second Memory unit and signals from said second and fourth limit switches for turning said first AND unit on to turn said first Memory unit on to cause said second means to rotate said rolls to the left when said carriage reaches an intermediate back position, means including means supplying a signal from said first limit switch for turning said first Memory unit off when said carriage reaches an intermediate forward position, means including means supplying an off signal from said first Memory unit and signals from said second and third limit switches for turning said second AND unit on to turn said second Memory unit on to cause said second means to rotate said rolls to the right when said carriage reaches said intermediate back position on its next passage back, and means including said means supplying a signal from first limit switch for turning said second Memory unit off when said carriage reaches said intermediate forward position on its next passage forward.

2. In a system for feeding strip to a press including a carriage for moving said strip, first means for moving said carriage to a forward position adjacent to said press and to a back position away from said press, feed rolls on said carriage, means for driving at least one of said feed rolls about its axis to advance the strip forwardly of said carriage, second means including a gear rack for rotating said rolls about their axes for feeding said strip into said press, third means for moving said rolls as a unit about an axis transverse to the roll axes to turn said strip alternately to the right and to the left, a first limit switch operated when said carriage has reached an intermediate forward position, means including said switch for causing said second means to rotate said rolls to feed said strip into said press, a second limit switch operated each time said carriage reaches an intermediate back position, a third limit switch operated when said third means has rotated said rolls to the right, fourth and fifth limit switches operated by said rack on its movement in one direction, said fourth switch operating before said fifth switch, means including said fourth switch for braking said rolls to slow their rotation, means including said fifth switch for braking said rolls to a stop, a sixth limit switch operated when said carriage reaches its forward position, fourth means for causing said press to act upon said strip, and a seventh limit switch operated when said press has acted upon said strip, the combination of signal supply means connected to said switches, means including a first Memory unit for causing said third means to rotate said rolls to the left, means including a first three-input AND unit for turning said Memory unit on, means including a second Memory unit for causing said third means to rotate said rolls to the right, means including means supplying an off signal from said second Memory unit and signals from said second and third limit switches for turning said first AND unit on to turn said first Memory unit on to cause said third means to rotate said rolls to the left when said carriage reaches an intermediate back position, a second three-input AND unit, means including means using signals from said fourth, fifth and sixth limit switches for turning said second AND unit on, means including means using an output signal from said second AND unit for causing said fourth means to cause said press to act upon said strip, a third Memory unit, means including means using an output signal from the on side of said third Memory unit for causing said first means to move said carriage back, and means including means using a signal from said seventh limit switch for turning said third Memory unit on.

3. The invention claimed in claim 2 in which said means for turning said third Memory unit on includes a two-input AND unit, in which said system includes an eighth limit switch which is operated when said rolls have been rotated by said third means to the left, and in which means is provided using signals from said first Memory unit and from said eighth switch to turn said two-input AND unit on to turn said third Memory unit on.

4. The invention claimed in claim 3 in which means including means supplying a signal from said first limit switch is provided for turning said first Memory unit off when said carriage reaches an intermediate forward position.

5. The invention claimed in claim 2 in which means including means supplying a signal from said first limit switch is provided for turning said first Memory unit off when said carriage reaches an intermediate forward position.

6. In a system for feeding strip forwardly into a press including a carriage for moving said strip, first means for moving said carriage alternately forward and back, feed rolls on said carriage, means for driving at least one of said feed rolls about its axis to advance the strip forwardly of said carriage, second means including a gear rack for rotating said rolls, means for braking said rolls, a first limit switch operated when said carriage has reached an intermediate forward position, means including said switch for releasing said braking means and for causing said second means to rotate said rolls, second and third limit switches operated when said rack moves in one direction, said second switch operating before said third switch, means including said second switch for causing said braking means to slow said rolls, means including said third switch for causing said braking means to stop said rolls, and press control means for causing said press to act upon said strip, the combination of a three-input AND unit, means including means using signals from said second and third switches for turning said AND unit on, and means energized when said AND unit has been turned on for causing said press control means to cause said press to act upon said strip.

7. The invention claimed in claim 6 in which said system includes a fifth limit switch which is operated by said press when it has acted upon said strip, in which means including a first two-input AND unit is provided for causing said first means to move said carriage back, in which means including a second two-input AND unit is provided for causing said first means to move said carriage forward, in which means including a Memory unit is provided for turning said two-input AND units on, said Memory unit when on supplying a signal to turn on said first AND unit, and when off supplying a signal to turn said second AND unit on, and in which means is provided which includes means using a signal from said fifth switch for turning said Memory unit off.

8. In a system for feeding a strip including a carriage, feed rolls for said strip on said carriage, first means for moving said carriage alternately forward and back, second means including a reciprocatory gear rack for rotating said rolls, third means for moving said rack, a first limit switch operated when said carriage has reached an intermediate forward position, a second limit switch operated when said rack has been moved in one direction, and a third limit switch operated when said rack has been moved in the opposite direction, the combination of means including a first AND unit for causing said third means to move said rack in said one direction, means including a second AND unit for causing said third means to move said rack in said opposite direction, a Memory unit connected to said AND units to turn them on, said Memory unit when on delivering a signal to turn said first AND unit on, and when off, delivering a signal to turn said second AND unit on, means including means supplying signals from said first and second switches for turning said Memory unit on, and means including means supplying signals from said first and third switches for turning said Memory unit off.

9. In a system for feeding strip into a press including a carriage for moving said strip, first means for moving said carriage to a forward position adjacent to said press and to a back position away from said press, feed rolls for said strip on said carriage, second means including a reciprocatory gear rack for rotating said rolls about their axes, third means for rotating said rolls as a unit alternately to the right and to the left for turning said strip over each time said carriage is moved by said first means to an intermediate back position, a first limit switch operated when said carriage has reached an intermediate forward position, means including said switch for causing said second means to rotate said rolls, a second limit switch operated when said carriage has reached an intermediate back position, a third limit switch operated when said third means has rotated said rolls to the left, a fourth limit switch operated when said third means has rotated said rolls to the right, fifth and sixth limit switches operated when said rack has moved in one direction, said fifth switch operating before said sixth switch, means including said fifth switch for braking said rolls to slow them, means including said sixth switch for braking said rolls to a stop, a seventh limit switch operated when said carriage has reached its forward position, fourth means for causing said press to act upon said strip, and an eighth limit switch operated when said press has acted upon said strip, the combination of means, including a first Memory unit for causing said third means to rotate said rolls to the left, means including a first three-input AND unit for turning said Memory unit on, means including a second Memory unit for causing said third means to rotate said rolls to the right, means including a second three input AND unit for turning said second Memory unit on, signal supply means connected to said switches, means including means supplying an off signal from said second Memory unit and signals from said second and fourth switches for turning said first AND unit on to turn said first Memory unit on to cause said third means to rotate said rolls to the left when said carriage reaches an intermediate back position, a third three-input AND unit, means including means supplying signals from said fifth, sixth and seventh switches for turning said third AND unit on, means including means using a signal from said third AND unit for causing said fourth means to cause said press to act upon said strip, means including a first two-input AND unit for causing said first means to move said carriage back, means including a second two-input AND unit for causing said first means to move said carriage forward, means including a third Memory unit for turning said two-input AND units on, said third Memory unit when on, supplying a signal to turn said first two-input AND unit on, and when off, supplying a signal to turn said second two-input AND unit on, means including means supplying a signal from said eighth switch for turning said third Memory unit on to cause said first means to move said carriage back, means including means supplying an off signal from said first Memory unit and signals from said second and third limit switches for turning said third AND unit on to turn said second Memory unit on to cause said third means to rotate said rolls to the right, and means including means supplying a signal from said first limit switch for turning said first and second Memory units off.

10. In a system for feeding a strip including a carriage, feed rolls for said strip on said carriage, first means for moving said carriage alternately forward and back, second means including a reciprocatory rack for rotating said rolls, third means for moving said rack alternately in one direction and in the opposite direction, a first limit switch which is closed when said carriage reaches an intermediate forward position, a second limit switch which is closed when said rack has moved in said one direction, and a third limit switch which is closed when said rack has moved in said opposite direction, a first Memory unit, means including means using an output signal from the on output side of said Memory unit for causing said third means to move said rack in said one direction, a second Memory unit, means including means using an output signal from the on output side of said second Memory unit for causing said third means to move said rack in said opposite direction, a first three-input AND unit for turning said first Memory unit on, signal supply means connected to said limit switches, means including means supplying signals from said first and third limit switches and a signal from the off output side of said second Memory unit for turning said first AND unit on to turn said first Memory unit on, means for turning said first Memory unit off, a second three-input AND unit for turning said second Memory unit on, means including means supplying signals from said first and second limit switches and a signal from the off output side of said first Memory unit for turning said second AND unit on to turn said second Memory unit on, and means for turning said second Memory unit off.

11. The invention claimed in claim 10 in which a NOT unit is provided in the means for turning said first Memory unit off, in which means is provided for connecting the output side of said NOT unit to the off input terminal of said first AND unit, and in which means is provided for connecting the input of said NOT unit to said first limit switch so that when said first limit switch is open, said NOT unit is turned off and delivers a signal to turn said first Memory unit off.

12. The invention claimed in claim 11 in which a second NOT unit is provided in the means for turning said second Memory unit off, in which means is provided for connecting the output side of said second NOT unit to the off input terminal of said second Memory unit, and in which means is provided for connecting the input of said second NOT to said first limit switch so that when said first limit switch is open, said second NOT unit is turned off and delivers a signal to turn said second Memory unit off.

References Cited in the file of this patent

UNITED STATES PATENTS

| 552,947 | Williams | Jan. 14, 1896 |
| 1,435,979 | Reed | Nov. 21, 1922 |
| 2,354,293 | Schimmel | July 25, 1944 |
| 2,722,274 | Turnbull | Nov. 1, 1955 |
| 2,738,007 | Power et al. | Mar. 13, 1956 |